(12) United States Patent
Minard

(10) Patent No.: US 11,051,656 B2
(45) Date of Patent: Jul. 6, 2021

(54) COOKING APPARATUS WITH ADJUSTABLE COOKING SURFACE

(71) Applicant: TAYLOR COMMERCIAL FOODSERVICE, LLC, Rockton, IL (US)

(72) Inventor: James J. Minard, Roscoe, IL (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 286 days.

(21) Appl. No.: 16/302,968

(22) PCT Filed: May 30, 2017

(86) PCT No.: PCT/US2017/034925
§ 371 (c)(1),
(2) Date: Nov. 19, 2018

(87) PCT Pub. No.: WO2017/210152
PCT Pub. Date: Dec. 7, 2017

(65) Prior Publication Data
US 2019/0117019 A1    Apr. 25, 2019

Related U.S. Application Data

(60) Provisional application No. 62/343,259, filed on May 31, 2016.

(51) Int. Cl.
*A47J 27/00*    (2006.01)
*A47J 37/07*    (2006.01)
*A47J 37/06*    (2006.01)

(52) U.S. Cl.
CPC ......... *A47J 37/0786* (2013.01); *A47J 37/067* (2013.01); *A47J 37/0704* (2013.01); *A47J 2037/0795* (2013.01)

(58) Field of Classification Search
CPC ...... A47J 37/06; A47J 37/0611; A47J 37/067; A47J 37/07; A47J 37/0704; A47J 37/0786;
(Continued)

(56) References Cited

U.S. PATENT DOCUMENTS 5,791,234 A    8/1998 Newton et al.
5,802,958 A    9/1998 Hermansson
(Continued)

FOREIGN PATENT DOCUMENTS

CN    1875833    12/2006
CN    101466293    6/2009
(Continued)

OTHER PUBLICATIONS

Notice of Allowance and Intention to grant for International European Patent Application No. 17 729 644.9, dated Apr. 24, 2020.
(Continued)

*Primary Examiner* — Hung D Nguyen
(74) *Attorney, Agent, or Firm* — Barnes & Thornburg LLP

(57) ABSTRACT

A cooking apparatus includes a cooking surface, a leveling device, an inclinometer, and an electronic controller. The leveling device is constructed and arranged to adjust a position of the cooking surface, and the inclinometer senses the cooking surface position. The electronic controller is configured to receive a position signal from the inclinometer and output a command signal to the leveling device for position adjustment.

12 Claims, 1 Drawing Sheet

(58) Field of Classification Search
CPC ...... A47J 2037/0617; A47J 2037/0795; H05B 3/681
USPC ......... 99/324, 325, 342, 349, 372, 375, 377, 99/379, 389, 391, 393, 422, 423, 425; 426/231, 233, 523
See application file for complete search history.

(56) References Cited

U.S. PATENT DOCUMENTS

| | | | |
|---|---|---|---|
| 5,910,207 | A | 6/1999 | Newton et al. |
| 6,016,743 | A | 1/2000 | Glavan |
| 7,448,373 | B2 | 11/2008 | Hill et al. |
| 7,472,645 | B2 | 1/2009 | Hill et al. |
| 8,359,970 | B2 | 1/2013 | Calzada et al. |
| 9,861,230 | B2 | 1/2018 | Freymiller et al. |
| 9,927,382 | B2 | 3/2018 | Freymiller et al. |
| 10,010,218 | B2 | 7/2018 | Sands et al. |
| 10,098,499 | B2 | 10/2018 | Nelson |
| 10,117,545 | B2 | 11/2018 | Nelson et al. |
| 10,159,379 | B2 | 12/2018 | Nelson |
| 10,213,050 | B2 | 2/2019 | Freymiller et al. |
| 2004/0129693 | A1* | 7/2004 | Hook .................. A47J 36/321 219/483 |
| 2005/0247210 | A1 | 11/2005 | Ragan |
| 2007/0254078 | A1 | 11/2007 | Calzada et al. |
| 2013/0071534 | A1 | 3/2013 | Newton |
| 2014/0023755 | A1 | 1/2014 | Claesson et al. |
| 2014/0026764 | A1 | 1/2014 | Sykes et al. |
| 2015/0108110 | A1 | 4/2015 | Freymiller et al. |
| 2015/0305556 | A1 | 10/2015 | Nelson |
| 2015/0305557 | A1 | 10/2015 | Nelson |
| 2016/0022091 | A1 | 1/2016 | Freymiller et al. |
| 2016/0037967 | A1 | 2/2016 | Glavan et al. |
| 2016/0045066 | A1 | 2/2016 | Sands et al. |
| 2016/0270290 | A1* | 9/2016 | Johnson ............... A01D 75/287 |
| 2016/0309941 | A1 | 10/2016 | Minard |
| 2018/0360269 | A1 | 12/2018 | Sands et al. |
| 2019/0038073 | A1 | 2/2019 | Nelson |
| 2019/0045972 | A1 | 2/2019 | Freymiller et al. |
| 2019/0059643 | A1 | 2/2019 | Minard et al. |
| 2019/0075966 | A1 | 3/2019 | Kelly |
| 2019/0104885 | A1 | 4/2019 | Pahnke et al. |
| 2019/0117019 | A1 | 4/2019 | Minard |

FOREIGN PATENT DOCUMENTS

| | | |
|---|---|---|
| CN | 109195490 | 1/2019 |
| WO | WO 2015/164489 A1 | 10/2015 |
| WO | WO 2017/210152 A1 | 12/2017 |

OTHER PUBLICATIONS

International Search Report for PCT/US2017/034925, dated Aug. 9, 2017, 5 pp.
Written Opinion for PCT/US2017/034925, dated Aug. 9, 2017, 6 pp.
Office Action issued in Application No. CN201780033798.1 (dated May 6, 2021).

* cited by examiner

COOKING APPARATUS WITH ADJUSTABLE COOKING SURFACE

RELATED APPLICATION

The present patent document claims the benefit of the filing date of International Patent Application No. PCT/US2017/034925, filed May 30, 2017, and Provisional Patent Application No. 62/343,259, filed May 31, 2016, which are hereby incorporated by reference.

BACKGROUND

The present disclosure relates to a cooking apparatus, and more particularly, to an adjustable cooking surface of the cooking apparatus.

Cooking apparatuses such as grills may cook a variety of food products such as, for example, eggs that are generally in a liquid form and meats such as hamburgers that may create grease runoff when cooked upon a cooking surface of the grill. The grill cooking surface may be typically mounted to rigid connections of a grill frame and/or support system. The supports may reside directly on, for example, a floor of a restaurant that may not be level. As a result, the cooking surface may be canted causing the eggs, grease and other cooking byproducts to travel in unwanted directions upon the cooking surface. Moreover, the cooked product may be thicker in some section and thinner in other section when a liquid or flowing product is poured on the grill and cooked. All of this may lead to operator or cook frustration, increase in labor, and a reduction in food quality. Improvements in the ability to control the cooking surface position is desirable.

SUMMARY

A cooking apparatus according to one, non-limiting, embodiment of the present disclosure includes a cooking surface; a leveling device constructed and arranged to adjust a position of the cooking surface; an inclinometer configured to sense the position; and an electronic controller configured to receive a position signal from the inclinometer and output a command signal to the leveling device for position adjustment.

Additionally to the foregoing embodiment, the cooking apparatus includes a user interface configured to send a desired position signal to the controller.

In the alternative or additionally thereto, in the foregoing embodiment, the inclinometer senses the position relative to a horizontal plane and the controller includes a computer processor configured to compare the position signal to a pre-programmed position and output the command signal to achieve the pre-programmed position.

In the alternative or additionally thereto, in the foregoing embodiment, the cooking apparatus includes a user interface configured to input the pre-programmed position to the controller.

In the alternative or additionally thereto, in the foregoing embodiment, the controller applies an algorithm to the position signal and the pre-programmed position to achieve the command signal.

In the alternative or additionally thereto, in the foregoing embodiment, the pre-programmed position includes a height component.

In the alternative or additionally thereto, in the foregoing embodiment, the pre-programmed position includes a tilt component.

In the alternative or additionally thereto, in the foregoing embodiment, the leveling device includes three actuators generally distributed about the cooking surface with each actuator constructed and arranged to move the cooking surface in a vertical direction.

In the alternative or additionally thereto, in the foregoing embodiment, the command signal includes three command signals with each command signal sent to a respective actuator of the three actuators.

In the alternative or additionally thereto, in the foregoing embodiment, the pre-programmed position includes a tilt component.

In the alternative or additionally thereto, in the foregoing embodiment, the cooking apparatus is a grill.

In the alternative or additionally thereto, in the foregoing embodiment, the cooking apparatus is mobile.

In the alternative or additionally thereto, in the foregoing embodiment, the cooking apparatus includes a user interface configured to input the pre-programmed position to the controller.

In the alternative or additionally thereto, in the foregoing embodiment, the user interface includes a tilt interface for changing the tilt component with reference to the horizontal plane.

In the alternative or additionally thereto, in the foregoing embodiment, the user interface includes a height interface for changing a height component of the pre-programmed position.

In the alternative or additionally thereto, in the foregoing embodiment, the cooking apparatus is a grill, the cooking surface faces substantially upward and includes a contour for collecting run-off of a food product, and the tilt component facilitates run-off into the contour.

In the alternative or additionally thereto, in the foregoing embodiment, the inclinometer is a dual axis inclinometer.

A cooking grill according to another, non-limiting, embodiment includes a cooking surface facing substantially upward; a dual axis leveling device constructed and arranged to adjust a position of the cooking surface; a dual axis inclinometer configured to sense the position relative to a horizontal plane; and a computer-based controller configured to receive a position signal from the inclinometer, compare the position signal to a pre-programmed position, and output a command signal to the dual axis leveling device to realize the pre-programmed position.

Additionally to the foregoing embodiment, the cooking grill includes a user interface configured to send a desired position signal to the controller to establish the pre-programmed position, and wherein the desired position signal includes a tilt component.

In the alternative or additionally thereto, in the foregoing embodiment, the cooking grill is mobile.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
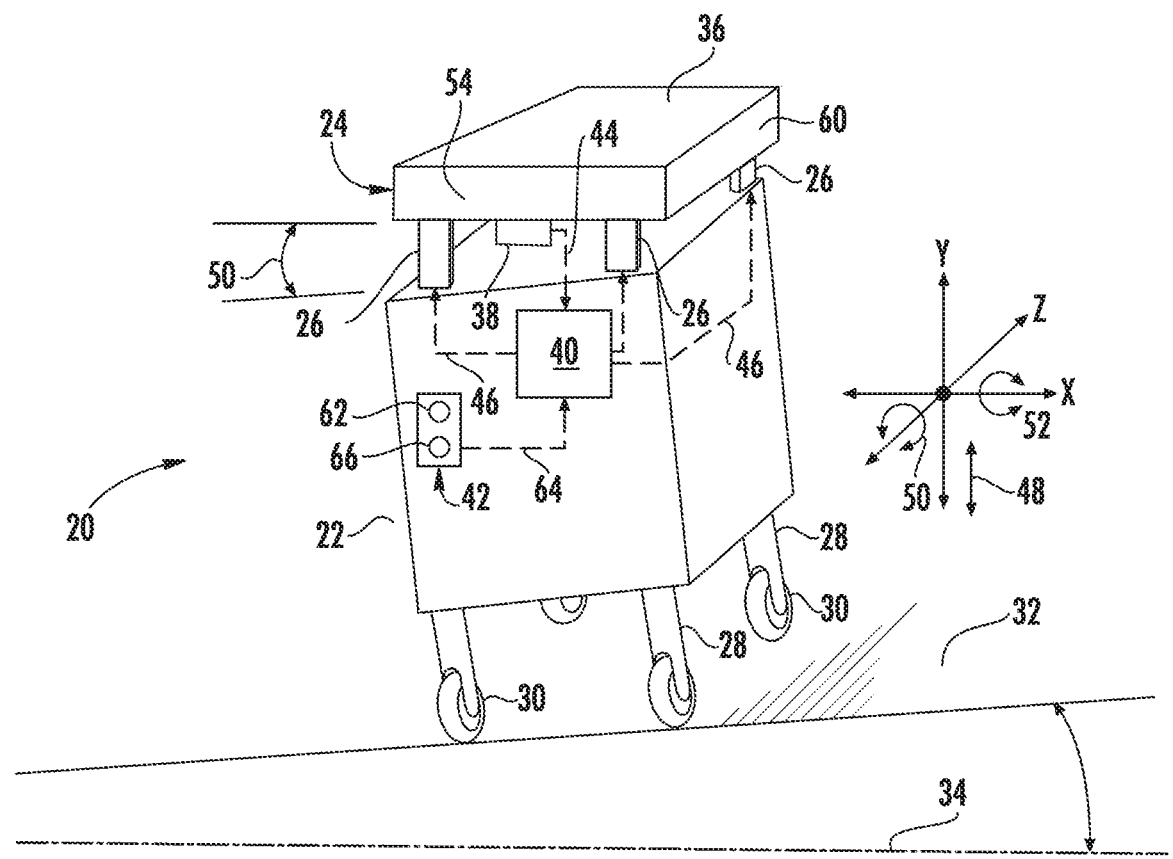
FIG. 1 is a perspective view of a cooking apparatus.

Referring to FIG. 1, a cooking apparatus 20 may be a grill that is illustrated as one, non-limiting, embodiment of the present disclosure. The grill 20 includes a base structure 22, a platen 24, a leveling device 26 and a plurality of legs 28 that rest upon a floor 32 which may not be level with respect to a horizontal plane 34 (i.e., earth level). The leveling device 26 facilitates leveling control of the platen 24 that carries a cooking surface 36. By controlling the level a canted position of the cooking surface 36 may be minimized or avoided preventing unwanted travel of certain food products (e.g., eggs, pancakes, and other semi-solid foods). By preventing the undesired flow of a food product upon the cooking surface 36, the quality of the cooked product (e.g., consistent thickness, even cook-through, etc.) may be optimized while reducing cook frustration and labor. Moreover, in other scenarios, the cooking surface or platen 24 may be controllably canted, raised, or lowered to assist in, for example, the flow of grease and/or cleaning procedures.

The legs 28 of the grill 20 may project downward from the base structure 22 and may include wheels 30 that role upon the floor 32, thereby facilitating mobility of the cooking apparatus 20. The leveling device 26 is constructed and arranged to adjust the positioning of the platen 24 relative to the base structure 22. The leveling device 26 may be generally supported by the base structure 22 and may be located, at least in-part, between the base structure 22 and the platen 24. The platen 24 may be located above the base structure 22 and carries a cooking surface 36 that faces substantially upward and is located at a height that is convenient for an operator or cook to work upon.

The cooking apparatus 20 may further include a position or displacement sensor 38, a controller 40 and a user interface 42. The displacement sensor 38 may be an inclinometer operatively engaged to, for example, an underside of the platen 24. The controller 40 may include a computer processor (e.g. microprocessor) and a computer readable and writeable storage medium. In operation, the controller 40 may be configured to receive a position signal (see arrow 44) from the inclinometer 38 that is associated with an actual position of the cooking surface 36 of the platen 24. The controller 40 may then process the position signal 44 by applying an algorithm and comparing the signal to a pre-programmed position that is, at least in-part, relative to the horizontal plane 34. Once the position signal 44 is processed, the controller 40 outputs at least one command signal (see arrows 46) to the leveling device 26 for re-positioning of the cooking surface 36.

Figure 2:
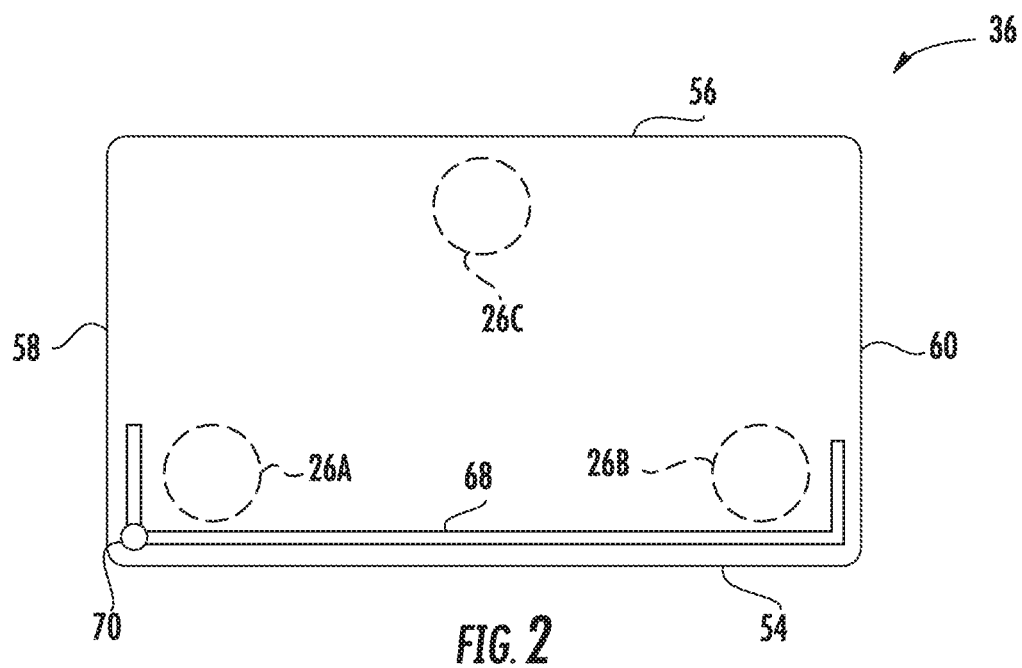
FIG. 2 is a top view of a cooking surface of the cooking apparatus.

Referring to FIGS. 1 and 2, the actual position of the cooking surface 36 may include a height component (see arrow 48 along the illustrated Y-axis), a side-to-side tilt component (see arrow 50 extending about an illustrated Z-axis), and a forward-to-aft tilt component (see arrow 52 extending about an illustrated X-axis). The cooking surface 36 may generally be bounded by a forward edge 54, and opposite rearward edge 56 and two opposite flanking or side edges 58, 60 both spanning between the forward and rearward edges 54, 56. The height component 48 is associated with the general height of the cooking surface 36 from, for example, the floor 32. The side-to-side tilt component 50 may generally be associated with the vertical positioning of the flanking side edges 58, 60. For example, raising the left side edge 58 and lowering right side edge 60 would tilt the cooking surface 36 downward toward the right. Similarly, the forward-to-aft tilt component 52 may generally be associated with the vertical positioning of the forward and rearward edges 54, 56. For example, raising the rearward edge 56 and lowering the forward edge 54 would tilt the cooking surface 36 downward toward the cook.

Because the cooking surface 36 may be capable of tilting about the X and Z axes, the leveling device 26 may be a dual axis leveling device, and the inclinometer 38 may be a dual axis inclinometer. One example of a dual axis leveling device 26 may be a device having at least three linear actuators 26A, 26B, 26C. Other types of leveling devices 26 may include rotational devices having a configuration of cam surfaces and/or pulley systems configured to suspend the platen 24 from above or adjustably support the platen from below, or other devices capable of dual axis adjustment.

The user interface 42 of the grill 20 may facilitate tailored adjustment of the cooking surface 36 by, for example, a cook. More specifically, the controller 40 may be pre-programmed to automatically maintain a horizontal cooking surface 36; however, the user interface 42 may include a height adjustment interface 62. During a grill cleaning process or if the cook is exceptionally tall, the cook may desire to raise the cooking surface 36 and may do so by operating the height interface 62. If the initial position of the cooking surface 36 is horizontal (i.e., level), actuation of the height interface 62 of the user interface 42 to raise the surface may send a raise signal (see arrow 64) to the controller 40. The controller 40 may then send individual command signals 46 to each of the three actuators 26A, 26B, 26C causing the actuators to extend vertically by an equivalent distance. It is contemplated and understood that the controller 40 may facilitate a constant adjusting motion such that the cooking surface 36 will be generally in constant oscillation during the cook cycle instead of intermittent fixed single position(s). Yet further, the controller 30 may adjust the cooking surface 36, generally constantly, to "stir" or "agitate" the product during the cook cycle.

The user interface 42 may further include a tilt interface 66 that facilitates controlled deviation from a horizontal position. For example, the cooking surface 36 may include a contour or groove 68 intended to channel food byproducts such as grease away from the remaining cooking surface. The groove 68 may further communicate with a drain hole 70 that extends through the cooking surface 36. While cooking certain food products, or during a grill cleaning process, a cook may desire to more quickly or easily move food byproducts toward the groove 68 that may be proximate to the forward edge 54. In this embodiment, the cook may desire to deviate the cooking surface 36 from a horizontal position and tilt the surface about the X-axis moving the forward edge 54 down and/or the rearward edge 56 up. In this example, the actuators 26A, 26B proximate to the forward edge 54 may retract and/or the actuator 26C proximate to the rearward edge 56 may further extend. In any tailored position conducted through use of the user interface 42, the dual axis inclinometer 38 may measure the real-time position of the cooking surface 36 and send this signal to the controller 40 thereby forming a closed loop feedback of actual angular measurement.

Benefits and advantages of the present disclosure include automatic positioning of a cooking surface relative to a horizontal plane, and a convenient means to deviate from the horizontal plan to meet specific desires of a cook utilizing a closed loop feedback of actual angular measurements. Other advantages include the ability to set specific tilt angles during or after a cook cycle to manage grease migration or cleaning solutions. Certain food products, such as liquid eggs, may benefit from being cooked flat by producing a uniform finished product which increase product quality.

While the present disclosure is described with reference to illustrated embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A cooking apparatus comprising:
    a cooking surface facing substantially upward, the cooking surface being planar and bounded by opposite front and rear edges and opposite left and right edges;
    a leveling device constructed and arranged to adjust a position of the cooking surface, wherein the leveling device is capable of adjusting a forward-to-aft rotational position about a first axis parallel to the front edge and adjusting a side-to-side rotational position about a second axis parallel to the right edge, and wherein the leveling device being further capable of adjusting a height of the cooking surface;
    wherein the leveling device comprises three actuators that engage a lower surface of the cooking surface, wherein each of the three actuators is constructed and arranged to move the cooking surface in a vertical direction, wherein coordinated movement of the three actuators causes an adjustment of one or more of the height of the cooking surface, the forward-to-aft rotational position, and the side-to-side rotational position;
    a dual axis inclinometer configured to sense the position in the forward-to-aft rotational position and the side-to-side rotational position; and
    an electronic controller configured to receive a position signal from the dual axis inclinometer and output a command signal to the leveling device for position adjustment, and
    further comprising a user interface configured to send a desired position signal to the controller corresponding to a desired position of the cooking surface, wherein the desired position is a position wherein one or both of a forward-to-aft rotational position and a side-to-side rotational position results in a cooking surface position that is not parallel to a horizontal plane, wherein the controller causes adjustment of one or all of the three actuators to adjust the cooking surface to the desired position.

2. The cooking apparatus set forth in claim 1, wherein the dual axis inclinometer senses the position relative to the horizontal plane and the controller includes a computer processor configured to compare the position signal to a pre-programmed position and output the command signal to achieve the pre-programmed position, wherein when the desired position signal is sent the desired position signal is the pre-programmed position.

3. The cooking apparatus set forth in claim 2, wherein the controller applies an algorithm to the position signal and the pre-programmed position to achieve the command signal.

4. The cooking apparatus set forth in claim 3, wherein the pre-programmed position includes a height component.

5. The cooking apparatus set forth in claim 3, wherein the pre-programmed position includes a tilt component in the forward-to-aft rotational direction and a tilt component in the side-to-side rotational direction.

6. The cooking apparatus set forth in claim 2, wherein the command signal includes three command signals with each command signal sent to a respective actuator of the three actuators.

7. The cooking apparatus set forth in claim 6, wherein the pre-programmed position includes a tilt component in the forward-to-aft rotational direction and a tilt component in the side-to-side rotational direction.

8. The cooking apparatus set forth in claim 2, wherein the user interface includes a tilt interface for changing the tilt component with reference to the horizontal plane with respect to the forward-to-aft rotational position and with respect to the side-to-side rotational position.

9. The cooking apparatus set forth in claim 8, wherein the user interface includes a height interface for changing a height component of the pre-programmed position.

10. The cooking apparatus set forth in claim 8, wherein the cooking apparatus is a grill, the cooking surface faces substantially upward and includes a contour for collecting run-off of a food product, and the tilt component facilitates run-off into the contour.

11. The cooking apparatus set forth in claim 1, wherein the cooking apparatus is a grill.

12. The cooking apparatus set forth in claim 11, wherein the cooking apparatus is mobile when not in use for cooking operations.

* * * * *